United States Patent [19]

Dove

[11] Patent Number: 4,548,336

[45] Date of Patent: Oct. 22, 1985

[54] TABLET DISPENSER

[75] Inventor: Robert L. Dove, Weyers Cove, Va.

[73] Assignee: Degesch GmbH, Frankfurt am Main, Fed. Rep. of Germany

[21] Appl. No.: 536,391

[22] Filed: Sep. 27, 1983

[51] Int. Cl.⁴ .............................................. B65H 3/62
[52] U.S. Cl. ..................................... 221/203; 221/265
[58] Field of Search ...................... 221/264, 265, 4, 5, 221/203; 222/370, 242

[56] References Cited

U.S. PATENT DOCUMENTS

| 2,176,232 | 10/1939 | Warren et al. | 222/265 |
| 2,227,167 | 12/1940 | Warren | 222/265 |
| 2,543,934 | 3/1951 | Poskey | 222/370 |
| 3,172,579 | 3/1965 | Kelley et al. | 222/242 X |
| 4,191,308 | 3/1980 | Allen et al. | 221/265 X |

Primary Examiner—Stanley H. Tollberg
Attorney, Agent, or Firm—Cushman, Darby & Cushman

[57] ABSTRACT

A dispensing device for a toxic material in tablet form includes a support member for a container for the toxic tablets which has an interior chamber including a dispensing wheel which is rotatable by means of an external handle to bring openings containing a tablet sequentially into registration with a dispensing channel in the container support member; an external handle actuates the dispensing wheel and also an agitation axle which extends through the support member into a container mounted thereon.

4 Claims, 3 Drawing Figures

TABLET DISPENSER

BACKGROUND AND SUMMARY OF THE INVENTION

The present invention relates to a dispensing device for tablets of the type that are toxic to humans and which therefore require extreme care in dispensing in an environment.

In the field of rodent control, a number of proposals have originated which call for the periodic dispensing of a plurality of pellets of a toxic substance over a well-defined geographic area. One such substance is Phostoxin, a trademark of Degesch GmbH, and which is a hydrogen phosphide material which when contacted with atmospheric moisture results in the generation of phosgene gas which is highly toxic.

In the fumigation of areas infested with rodents, it has been the practice to inject the toxic substance directly into the burrows of the rodents. However, this presents certain problems to a fumigator which it is the object of the present invention to overcome.

Specifically, it is necessary that the dispensing mechanism permit the fumigator to inject the toxic substance directly into the burrows without the fumigator coming into direct contact with the toxic substance. Further, for environmental reasons, it is necessary that the correct amount of the toxic substance be delivered to the burrow.

These objects are obtained by the dispensing device of the present invention which, in a preferred embodiment, enables the fumigator to inject exactly the desired number of tablets directly into a rodent burrow without the fumigator contacting the toxic substance.

In summary, the present invention provides a dispensing device including a container support member having an opening at one end on which a container for the toxic tablets can be sealingly mounted so as to load an interior chamber which has a bottom wall on which is mounted a dispensing star wheel which is rotatable by an external handle and which will deliver a single tablet at a time to a dispensing channel which extends externally of the container support member. The dispensing channel may be connected to a length of flexible hose which can be inserted by the user into a rodent burrow in such a manner so that gravity will effect accurate dispensing of one or more tablets, as desired, into the burrow. The container support member includes means for securely and sealingly mounting the container on the container support member so that the fumigator need never come into direct contact with the tablets.

The foregoing and other advantages of the present invention will become apparent as consideration is given to the following detailed description taken in conjunction with the accompanying drawings, in which:

DETAILED DESCRIPTION OF THE INVENTION

Figure 1:
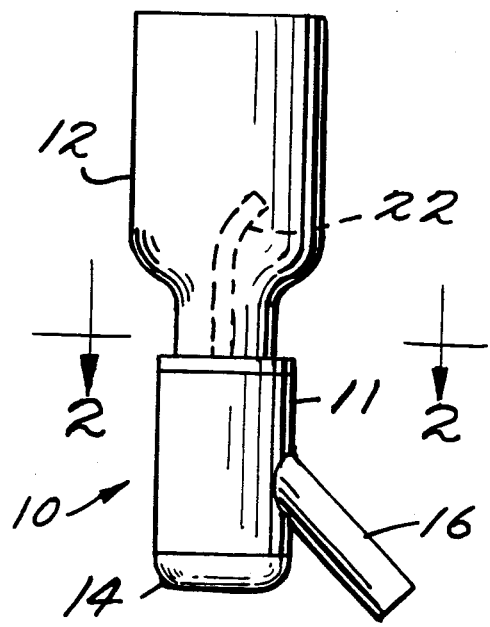
FIG. 1 is a side view in elevation of the dispensing device of the present invention with a container attached.

Referring now to the drawings wherein like numerals designate corresponding parts throughout the several views, there is shown in FIG. 1, in side elevation, the dispensing device 10 of the present invention which includes a cylindrical container support means or member 11 which to its upper portion has a container 12 mounted. From its side wall, a dispensing tube 16 extends at an angle to the longitudinal axis of the container support member 11. On the bottom portion of the member 11 a dispensing actuation handle 14 is mounted.

Figure 2:
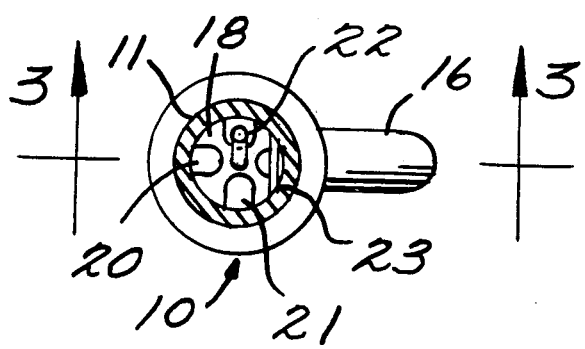
FIG. 2 is a view along lines 2—2 of FIG. 1.
Figure 3:
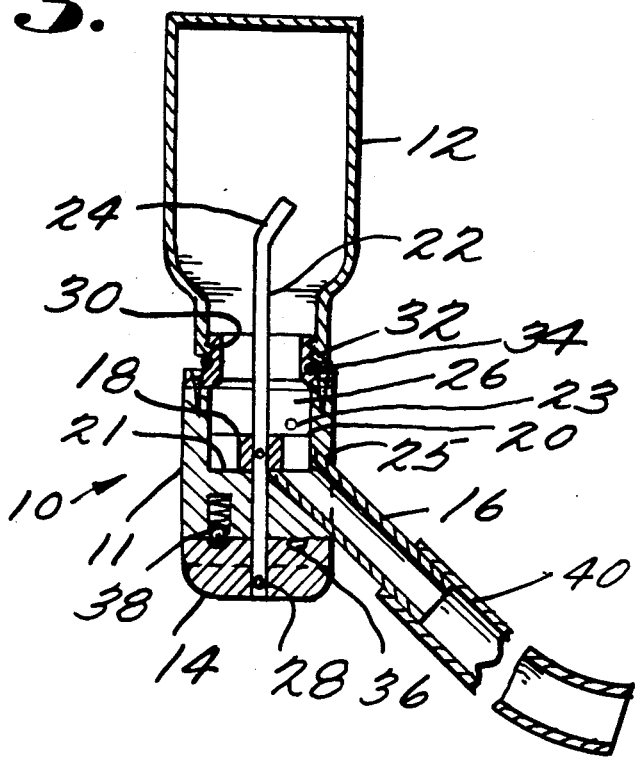
FIG. 3 is a view along lines 3—3 of FIG. 2.

Referring now to FIG. 2, it will be seen that the container support member 11 has an interior chamber which, on its bottom wall 21, is provided with a star wheel 18 having four equally angularly spaced openings 20 for receiving each a single tablet. The star wheel member 18 is mounted on an axle member 22 which, as shown in FIG. 3, extends upwardly through the container support member 11. Also, as shown in FIG. 2, in one position, an opening 20 will be located immediately beneath a pin member 23. This is provided to prevent more than one tablet at a time from being dispensed from an opening 20 as that opening 20 passes to the dispensing channel 16.

Referring now to FIG. 3, it will be seen that the container support member 11, as noted above, supports along its longitudinal axis the axle 22 which at one end has mounted thereon a rotating handle 14 which is secured to the adjacent end of the axle 22 by means of a pin 28. Also, the star wheel 18 is secured to an adjacent portion of the axle 22 by a pin, as illustrated. The elements may be made from a high molecular weight plastic which may be precisely molded to insure a close fit between the side walls of the interior chamber 26 and the bottom wall 21 thereof. The longitudinal dimension of each of the openings 20 is chosen so that only a single tablet can occupy each opening 20.

A mounting collar 30 is secured to the top end of the container support member 11 such as by the illustrated screws or by sonic welding or a suitable adhesive, as desired. About the base of the collar 30 externally thereof there is provided a resilient sealing ring 34 so that when the container 12 is threaded on the collar 30, a fluidtight seal will result.

The container support member includes dispensing channel opening 25 in which is inserted a dispensing tube 16 which may be of any suitable plastic such as polyvinyl chloride tubing. Preferably, the tubing 16 is suitably secured in the dispensing channel 25 such as by a suitable adhesive or by a friction fit. The dispensing channel 25 opens on the interior chamber 26 partially through the bottom wall 25 and partially through the side wall, as illustrated, so that the dispensing channel 25 and dispensing tube 16 will extend at an angle to the longitudinal axis of the container support member 11.

The bottom wall of the member 11 includes a bore in which is mounted a spring and detent ball 38. The ball 38 registers with recesses 36 which are formed in the upper surface of the handle 14 and are disposed to register with the openings 20 in the star wheel 18. Thus, with each rotation of the handle 14, when a recess 36 registers with the detent ball 38, this will signify that an opening 20 is in registry with the opening of the dispensing channel 25 on the interior chamber 26.

In use, an extension tube such as that as indicated at 40, of suitable length, can be mounted on the end of the dispensing tube 16 such as by a friction fit. Preferably the tube has sufficient flexibility to permit the fumigator to manipulate it and extend the end of the tube 40 deep into a rodent burrow. Thereafter, the handle 14 is rotated to dispense a single tablet, or several tablets sequentially, as desired into the rodent burrow.

As noted previously, the axle 22 has its upper end bent as at 24 to act as an agitator for the tablets in the container 12.

A suitable shoulder harness and strap can be employed by a fumigator so that he may have one hand free to rotate the handle 14 with the other hand being used to manipulate the tube 40.

Having described the invention, it will be apparent to those skilled in this art that various modifications may be made thereto without departing from the spirit and scope of this invention as defined in the appended claims.

What is claimed is:

1. A toxic fumigant tablet dispensing device comprising a toxic fumigant tablet container support means having an interior chamber having, at one end thereof, a bottom wall and, at an opposite end thereof, an opening for receiving tablets from a container, said opposite end having means for mounting a container's open end thereon with the container open end in flow communication with said opening of said interior chamber, said container support means having a longitudinal axis and a dispensing channel extending from said bottom wall through said container support means to the exterior thereof and at an angle to said longitudinal axis, said interior chamber having movable dispensing means mounted on said bottom wall thereof, said container support means having actuating means carried externally thereof for actuating said movable dispensing means, said movable dispensing means including a star wheel mounted on a central axle, said central axle extending through a bore formed in said container support means with said bore having a diameter to thereby establish a close fit with said central axle, said central axle terminating exteriorally of said container support means, a handle means being secured to said axle on the portion thereof extending externally of said container support means whereby rotation of said handle will impart rotation to said star wheel through said axle, said axle extending through said interior chamber and beyond said opening at the opposite end of said interior chamber whereby said axle will extend into a container mounted on said opposite end to effect agitation of tablets in the container upon actuation of said star wheel, said means for mounting a container's open end including a neck portion having external threads and a base and a resilient sealing ring mounted about said base, said dispensing channel including a dispensing tube means secured in said channel and extending at an angle away from said container support means so as to prevent contact by a user operating said handle member with tablets dispensed through said dispensing tube means.

2. The device as claimed in claim 1 wherein said star wheel has at least four equally radially disposed openings each having an axial length substantially equal to or greater than the largest dimension of the tablets to be dispensed.

3. The device as claimed in claim 1 wherein said axle has a free end which is bent to extend at an angle to a major portion of said axle.

4. The device as claimed in claim 2 wherein said handle includes a surface portion having a plurality of spaced recesses corresponding to the spaced openings in said star wheel and said container support means includes detent means for resiliently engaging a said recess upon rotation of said handle to indicate to a user registration of an opening in said star wheel with said dispensing channel.

* * * * *